United States Patent
Vo et al.

(10) Patent No.: US 11,603,583 B2
(45) Date of Patent: Mar. 14, 2023

(54) RIBBONS AND POWDERS FROM HIGH STRENGTH CORROSION RESISTANT ALUMINUM ALLOYS

(71) Applicant: NanoAL LLC, Ashland, MA (US)

(72) Inventors: Nhon Q. Vo, Winchester, MA (US); Joseph R. Croteau, Boston, MA (US); Davaadorj Bayansan, Glenview, IL (US); Amirreza Sanaty-Zadeh, Milwaukee, WI (US); Evander Ramos, Los Angeles, CA (US)

(73) Assignee: NanoAL LLC, Ashland, MA (US)

( * ) Notice: Subject to any disclaimer, the term of this patent is extended or adjusted under 35 U.S.C. 154(b) by 0 days.

(21) Appl. No.: 15/681,969

(22) Filed: Aug. 21, 2017

(65) Prior Publication Data

US 2018/0010216 A1 Jan. 11, 2018

Related U.S. Application Data

(63) Continuation of application No. PCT/US2017/039211, filed on Jun. 26, 2017.
(Continued)

(51) Int. Cl.
| | |
|---|---|
| *C22F 1/053* | (2006.01) |
| *C22C 21/06* | (2006.01) |
| *B22F 9/08* | (2006.01) |
| *B22F 3/15* | (2006.01) |
| *B22F 3/20* | (2006.01) |

(Continued)

(52) U.S. Cl.
CPC ............ *C22C 21/06* (2013.01); *B05D 1/12* (2013.01); *B05D 7/14* (2013.01); *B22F 3/15* (2013.01); *B22F 3/20* (2013.01); *B22F 3/24* (2013.01); *B22F 9/082* (2013.01); *B22F 10/20* (2021.01); *B33Y 10/00* (2014.12); *B33Y 70/00* (2014.12); *B33Y 80/00* (2014.12); *C22C 1/0416* (2013.01); *C23C 24/04* (2013.01); *B22F 2003/247* (2013.01); *B22F 2301/052* (2013.01); *B22F 2998/10* (2013.01); *Y02P 10/25* (2015.11)

(58) Field of Classification Search
CPC ......... C22C 21/10; C22F 1/053; B33Y 10/00; B33Y 70/00
See application file for complete search history.

(56) References Cited

U.S. PATENT DOCUMENTS

| | | |
|---|---|---|
| 3,418,177 A | 12/1968 | Pryor |
| 3,551,143 A | 12/1970 | Marukawa et al. |

(Continued)

FOREIGN PATENT DOCUMENTS

| | | |
|---|---|---|
| CN | 101923908 B | 12/2010 |
| CN | 103233147 A | 8/2013 |

(Continued)

OTHER PUBLICATIONS

Joys, J. 'Production of Aluminum and Aluminum-Alloy Powder', Powder Metallurgy, vol. 7, ASM Handbook, ASM International, 2015, p. 569-580. (Year: 2015).*

(Continued)

*Primary Examiner* — George Wyszomierski
*Assistant Examiner* — Janell C Morillo

(57) ABSTRACT

Aluminum alloys, fabricated by a rapid solidification process, with high strength, high ductility, high corrosion resistance, high creep resistance, and good weldability.

20 Claims, 14 Drawing Sheets

Related U.S. Application Data

(60) Provisional application No. 62/477,838, filed on Mar. 28, 2017, provisional application No. 62/358,400, filed on Jul. 5, 2016.

(51) Int. Cl.
*B33Y 10/00* (2015.01)
*B33Y 70/00* (2020.01)
*B22F 3/24* (2006.01)
*B05D 1/12* (2006.01)
*B05D 7/14* (2006.01)
*B33Y 80/00* (2015.01)
*C22C 1/04* (2023.01)
*C23C 24/04* (2006.01)
*B22F 10/20* (2021.01)
*C22C 21/10* (2006.01)

(56) References Cited

U.S. PATENT DOCUMENTS

| | | | |
|---|---|---|---|
| 3,807,969 | A | 4/1974 | Schoerner et al. |
| 3,993,476 | A | 11/1976 | Koike |
| 4,028,795 | A | 6/1977 | Takahashi et al. |
| 4,995,920 | A | 2/1991 | Faure et al. |
| 5,087,301 | A | 2/1992 | Angers et al. |
| 5,327,955 | A | 7/1994 | Easwaran |
| 5,449,421 | A | 9/1995 | Hamajima et al. |
| 5,624,632 | A | 4/1997 | Baumann et al. |
| 5,976,214 | A | 11/1999 | Kondoh et al. |
| 6,149,737 | A | 11/2000 | Hattori et al. |
| 6,592,687 | B1 | 7/2003 | Lee et al. |
| 6,918,970 | B2 | 7/2005 | Lee et al. |
| 7,648,593 | B2 | 1/2010 | Pandey |
| 7,837,808 | B2 | 11/2010 | Heymes et al. |
| 7,871,477 | B2 | 1/2011 | Pandey |
| 7,879,162 | B2 | 1/2011 | Pandey |
| 7,909,947 | B2 | 3/2011 | Pandey |
| 8,017,072 | B2 | 9/2011 | Pandey |
| 8,323,373 | B2 | 12/2012 | Haynes, III et al. |
| 8,409,373 | B2 | 2/2013 | Pandey |
| 8,778,099 | B2 | 7/2014 | Pandey |
| 9,453,272 | B2 | 9/2016 | Vo et al. |
| 2003/0192627 | A1 | 10/2003 | Lee et al. |
| 2006/0093736 | A1 | 5/2006 | Raybould et al. |
| 2009/0263273 | A1 | 10/2009 | Pandey |
| 2009/0263275 | A1 | 10/2009 | Pandey |
| 2010/0143177 | A1 | 6/2010 | Pandey et al. |
| 2010/0252148 | A1 | 7/2010 | Pandey |
| 2011/0017359 | A1 | 1/2011 | Pandey |
| 2011/0044843 | A1 | 2/2011 | Misra et al. |
| 2011/0052932 | A1 | 3/2011 | Pandey |
| 2012/0000578 | A1 | 1/2012 | Wang et al. |
| 2012/0234440 | A1 | 9/2012 | Miyata et al. |
| 2013/0183189 | A1 | 7/2013 | Bishop et al. |
| 2013/0199680 | A1 | 8/2013 | Apelian et al. |
| 2013/0220497 | A1 | 8/2013 | Huskamp et al. |
| 2014/0010700 | A1 | 9/2014 | Pandey |
| 2015/0135897 | A1 | 5/2015 | Sutcliffe et al. |
| 2016/0368244 | A1 | 12/2016 | Chung |
| 2017/0058386 | A1 | 3/2017 | Vo et al. |
| 2017/0182595 | A1* | 6/2017 | Nelson .................. B23K 26/067 |
| 2017/0233857 | A1* | 8/2017 | Lenczowski ........... B33Y 10/00 148/535 |
| 2019/0032175 | A1* | 1/2019 | Martin ..................... C22C 1/10 |

FOREIGN PATENT DOCUMENTS

| | | |
|---|---|---|
| CN | 105401020 A | 3/2016 |
| CN | 105401026 A | 6/2016 |
| DE | 102013004182 A1 | 9/2014 |
| EP | 0 558 957 A2 | 9/1993 |
| EP | 1 170 394 A2 | 1/2002 |
| EP | 2 241 644 A1 | 10/2010 |
| JP | H60-033333 A | 2/1985 |
| JP | S60-248862 A | 12/1985 |
| JP | 6296643 A | 5/1987 |
| JP | H01-143791 A | 6/1989 |
| JP | H05-320809 A | 12/1993 |
| JP | S10-060554 A | 3/1998 |
| JP | 2004-197170 A | 7/2004 |
| JP | 2008-202134 A | 9/2008 |
| JP | 2013256678 A * | 12/2013 ............. C22C 21/00 |
| WO | WO 2013/183488 A1 | 12/2013 |

OTHER PUBLICATIONS

Davis, J.R. ASM Specialty Handbook: Aluminum and Aluminum Alloys, ASM International, pp. 685-686. (Year: 1993).*
Davis, J.R. "Aluminum and Aluminum Alloys", ASM International, pp. 46, 275,319. (Year: 1993).*
Sep. 6, 2017 Transmittal of International Search Report and Written Opinion of Int'l Searching Authority for PCT/US2017/039211.
N. Al-Aqeeli et al., "Development of New Al-Based Nanocomposites by Mechanical Alloying" *Material Science and Engineering A*, 480 (2008) 392-396.
R. Grimes et al., "Development of a High Strain Rate Superplastic Al—Mg—Zr Alloy," *Material Science and Technology*, vol. 16, pp. 1334-1339 (Nov. 2000).
Z.Y. Ma et al., "High Strain Rate Superplasticity in Friction Stir Processed Al—Mg—Zr Alloy," *Material Science and Engineering A*, 351 (2003) 148-153.
E.O. Olakanmi et al., "A Review on Selective Laser Sintering/Melting (SLS/SLM) of Aluminum Alloy Powders: Processing, Microstructure, and Properties," *Progress in Materials Science* 74 (2015) 401-477.
John H. Martin et al., "3D Printing of High-Strength Aluminum Alloys," *Nature*, vol. 549, pp. 365-369 (Sep. 21, 2017).
Nicolas et al., "Characterisation and Modelling of Precipitate Evolution in an Al—Zn—Mg Alloy During Non-Isothermal Heat Treatments" *Acta Materialia* 51, pp. 6077-6094 (2003).
Non-Final Office Action dated May 4, 2016 for U.S. Appl. No. 14/645,654, 8 pages.
Non-Final Office Action dated Dec. 31, 2018 for U.S. Appl. No. 15/263,011, 5 pages.
Final Office Action dated Aug. 8, 2019 for U.S. Appl. No. 15/263,011, 7 pages.
Extended European Search Report dated Feb. 15, 2017 for European Application No. 15760733.4, 9 pages.
Extended European Search Report dated Sep. 23, 2019 for European Application No. 19172652.0, 8 pages.
International Search Report and Written Opinion dated Jun. 25, 2016 for International Application No. PCT/US2015/020218, 14 pages.
Extended European Search Report dated Nov. 22, 2019 for European Application No. 17824704.5, 11 pages.
Ahmad, Z. & Aleem, Abdul B. J., "Effect of nano $Al(Sc_{x-1}Zr_x)$ precipitates on the mechanical and corrosion behavior of Al-2.5 Mg Alloys," Materials and Corrosion, 62(4):335-345 (2011).
Berezina, A. L. et al., "Decomposition Processes in the Anomalous Supersaturated Solid Solution of Binary and Ternary Aluminum Alloys Alloyed with Sc and Zr," Acta Physica Polonica A, 122(3):539-543 (2011).
Booth-Morrison, C. et al., "Effect of Er additions on ambient and high-temperature strength of precipitation-strengthened Al—Zr—Sc—Si alloys," Acta Mater, 60:3463-3654 (2012).
Booth-Morrison, C. et al., "Role of silicon in accelerating the nucleation of $Al_3(Sc,Zr)$ precipitates in dilute Al—Sc—Zr alloys," Acta Mater, 60:4740-4752 (2012).
Booth-Morrison, C. et al., "Coarsening resistance at 400° C. of precipitation-strengthened AlZrScEr Alloys," Acta Mater, 59(18):7029-7042 (2011).
Fuller, C. B. et al., "Temporal evolution of the nanostructure of Al(Sc,Zr) alloys: Part 1—Chemical compositions of $Al_3(Sc_{1-x}Zr_x)$ precipitates," Acta Mater, 53:5401-5413 (2005).
Hallem, H. et al., "The formation of $Al_3(Sc_xZr_yHf_{1-x-y})$ dispersoids in aluminum alloys," Mater Sci Eng A, 421:154-160 (2006).

(56) References Cited

OTHER PUBLICATIONS

Hori, S. et al., "Effect of small addition of Si on the precipitation of Al-0.6%Zr Alloys," J Jpn Inst Light Met, 28:79-84 (1978).
Huang, H. et al., "Age Hardening Behavior and Corresponding Microstructure of Dilute Al—Er—Zr Alloys," Metallurgical and Materials Transactions A, 44A:2849-2856 (2013).
Hull, M., "Superplastic PM alloys aim for automotive applications," Powder Metallurgy, 43(3):203-206 (2000).
Kalinenko, A. et al., "Properties and Structure of Al—Zr—Fe—Si Alloy after Thermomechanical Treatment," AIP Conference Proceedings 2051, 020117 (2018), 11 pages; doi:10.1063/1.5083360.
Knipling, K. E. et al., "Criteria for developing castable, creep-resistant aluminum-based alloys—A Review," Z Metallkd, 97:246-265 (2006).
Knipling, K. E. et al., "Atom Probe Tomographic Studies of Precipitation in Al—0.1Zr—0.1Ti (at.%) Alloys," Microscopy and Microanalysis, 13:1-14 (2007).
Knipling, K. E. et al., "Nucleation and Precipitation Strengthening in Dilute Al—Ti and Al—Zr Alloys," Metallurgical and Materials Transactions A, 38A:2552-2563 (2007).
Knipling, K. E. et al., "Creep resistance of cast and aged Al—0.1Zr and Al—0.1Zr—0.1Ti (at.%) alloys at 300-400° C.," Scr Mater, 59:387-390 (2008).
Knipling, K. E. et al., "Precipitation evolution in Al—Zr and Al—Zr—Ti alloys during isothermal aging at 375-425° C.," Acta Mater, 56:114-127 (2008).
Knipling, K. E. et al., "Precipitation evolution in Al—Zr and Al—Zr—Ti alloys during isothermal aging at 450-600° C.," Acta Mater, 56:1182-1195 (2008).
Knipling, K. E. et al., "Precipitation evolution in Al—0.1Sc, Al—0.1Zr and Al—0.1Sc—0.1Zr (at.%) alloys during isochronal aging," Acta Mater, 58:5184-5195 (2010).
Knipling, K. E. et al., "Ambient- and high-temperature mechanical properties of isochronally aged Al—0.06Sc, Al—0.06Zr and Al—0.06Sc—0.06Zr (at.%) alloys," Acta Mater, 59:943-954 (2011).
LeClaire, A. D. et al., "3.2.13 Aluminum group metals," Diffusion in Solid Metals and Alloys (H. Mehrer (Ed.)), Springer Materials—Landolt-Börnstein—Group III condensed Matter, 26:151-156 (1990).
Li, H. et al., "Precipitation and evolution and coarsening resistance at 400° C. of Al microalloyed with Zr and Er," Scr Mater, 67:73-76 (2012).
Ma, Z. Y., "Friction Stir Processing Technology: A Review," Metallurgical and Materials Transactions A, 39(3):642-658 (2008).
Ohashi, T. et al., "Effect of Fe and Si on age hardening properties of supersaturated solid solution of Al—Zr," J Jpn. Inst Met, 34:604-640 (1970).

Riddle, Y. W. et al., "A Study of Coarsening, Recrystallization, and Morphology of Microstructure in Al—Sc—(Zr)—(Mg) Alloys," Metallurgical and Materials Transactions A, 35A:341-350 (2004).
Sato, T. et al., "Effects of Si and Ti Additions on the Nucleation and Phase Stability of the $L1_2$-Type $Al_3Zr$ Phase in Al—Zr Alloys," Mater Sci Forum, 217-222:895-900 (1996).
Seidman, D. N. et al., "Precipitation strengthening at ambient and elevated temperatures of heat-treatable Al(Sc) alloys," Acta Mater, 50:4021-4035 (2002).
Van Dalen, M. E. et al., "Effects of Ti additions on the nanostructure and creep properties of precipitation-strengthened Al—Sc alloys," Acta Mater, 53:4225-4235 (2005).
Wen, S. P. et al., "Synergetic effect of Er and Zr on the precipitation hardening of Al—Er—Zr alloy," Scr Mater, 65:592-595 (2011).
Zhang, Y. et al., "Precipitation evolution of Al—Zr—Yb alloys during isochronal aging," Scr Mater, 69:477-480 (2013).
Non-Final Office Action dated Jun. 26, 2020 for U.S. Appl. No. 15/263,011, 7 pages.
Office Action dated Sep. 2, 2020 from Chinese Application No. 201780051464.7, with English translation, 26 pages.
International Search Report and Written Opinion dated Aug. 7, 2020 for International Application No. PCT/US2019/038127, 23 pages.
Notice of Reasons for Rejection dated Jan. 5, 2021 for Japanese Application No. 2019-500396, with English translation, 11 pages.
Final Office Action dated Feb. 24, 2021 for U.S. Appl. No. 15/263,011, 7 pages.
Second Office Action dated Apr. 2, 2021 for Chinese Application No. 201780051464.7, with English translation, 17 pages.
Communication Pursuant to Article 94(3) EPC dated Jun. 15, 2021 for European Application No. 17824704.5, 5 pages.
Office Action dated Aug. 13, 2021 for Korean Application No. 10-2016-7028392, with English translation, 14 pages.
Notice of Reasons for Rejection dated Sep. 30, 2021 for Japanese Application No. 2019-500396, with English translation, 9 pages.
Rejection Decision dated Oct. 29, 2021 for Chinese Application No. 201780051464.7, with English translation, 14 pages.
Notice of Reasons for Rejection dated Jan. 18, 2022 for Japanese Application No. 2019-500396, with English translation, 5 pages.
First Office Action dated Oct. 8, 2021 for Chinese Application No. 201980053543.0, with English translation, 28 pages.
Li Shichun, "Interphase Diffusion Solution Zone-Superplastic of Zn—Al Eutectic Alloy," 1st Edition, China University of Petroleum Press, pp. 90-91, Jul. 2006, with English translation, 7 pages.
Notice of Reasons for Rejection dated Mar. 2, 2020 for Japanese Application No. 2019-500396, with English translation, 17 pages.

* cited by examiner

RIBBONS AND POWDERS FROM HIGH STRENGTH CORROSION RESISTANT ALUMINUM ALLOYS

The present application is a continuation of international application no. PCT/US2017/039211, filed 26 Jun. 2017, which claims the benefit of the filing dates of U.S. Ser. No. 62/358,400, filed 5 Jul. 2016, and U.S. Ser. No. 62/477,838, filed 28 Mar. 2017.

This invention was made with government support under PTE Federal Award No. W911NF-15-2-0026, Subaward No. 504062-78050, awarded by DOD/US Army through PTE Northeastern University. The Government has certain rights in the invention.

FIELD

This application relates to a family of aluminum alloys with high strength and ductility, excellent corrosion resistance and weldability. The disclosed alloys are especially advantageous for improving performance of aerospace, automotive, and recently developed additive manufacturing or so-called "3D-printing" components, and for forming a protective coating for magnesium or aluminum components.

BACKGROUND

Aluminum alloys have a wide range of applications in light weight structures in aerospace, automotive, marine, wire and cable, electronics, nuclear, and consumer products industries. Typically, aluminum alloys are produced by a traditional casting process, in which they are melted then poured into molds. The cast article can be near net-shape or in slab or billet forms, which are subsequently rolled to form sheet and plate products or extruded to produce profiles. Properties of the final products, thus, depend on the aluminum alloys' chemistry, casting solidification rate, and subsequent thermo-mechanical processes. The solidification rate of the aluminum alloys during traditional casting process is relatively low (<50° C./s). Thus, only certain casting microstructures in aluminum alloys can be obtained by a traditional casting process.

Rapid solidification processes (RSP) developed in the past decades can achieve refined grain size and extended solid solubility of alloying elements, and form non-equilibrium metastable phases. These enhance the properties of the alloys as compared to the ones manufactured by the traditional casting methods. RSP requires the solidification rate to be higher than 1,000° C./s. The time of contact between the molten aluminum and quenching medium is limited to a few thousandths of a second. The quenching medium, such as copper, water, or liquid nitrogen, significantly lowers the temperature of the molten aluminum to below its solidus temperature in a short amount of time, hence, rapid solidification is achieved by a very fast cooling rate. See U.S. Pat. No. 4,347,076.

A number of different RSP have been developed including gas atomization, spray deposition, melt spinning, melt extraction and beam glazing. Fabricated products can be in the form of ribbons, fibers, flakes, splats, granules, and powders. These small individual fragments are typically processed (cold isostatic compaction, hot pressing and extrusion) to fabricate the final products. Applications of aluminum alloys that are fabricated by RSP are in racing, automotive, aerospace, sporting, medical component, electronics, and optical industries.

Recent efforts in the prior art have been made to produce aluminum-magnesium-scandium alloys by RSP. These alloys typically contain high concentration of magnesium (3 to 5 wt. %) and scandium (0.7-1.4 wt. %). The alloys are strengthened by a combination of $Al_3Sc$ $L1_2$-structured nano-precipitates and aluminum matrix solid solution containing magnesium. The $Al_3Sc$ nano-precipitates form during solidification and subsequent aging in the temperature range from 250 to 350° C. The nano-precipitates are also responsible for the good weldability. See U.S. Pat. No. 5,624,632.

However, there are several drawbacks with Al—Mg—Sc alloys produced by RSP. Scandium is very expensive (tenfold as expensive as silver). Thus, the cost of the Al—Mg—Sc alloy is very high, which severely limits its commercial application. This alloy also has a limited thermal working window (<375° C.). Beyond this temperature, the beneficial strengthening of the $Al_3Sc$ nano-precipitates is permanently lost because they rapidly coarsen and become ineffective. This limits the extrusion temperature to be less than 375° C., which is undesirable to obtain fully dense extruded components.

Accordingly, it is desirable to improve upon the drawbacks of the Al—Mg—Sc alloys, produced by RSP, while maintaining the same combination of other properties. These include high strength at room and at elevated temperatures, high creep resistance, good weldability, and high corrosion resistance.

SUMMARY

The embodiments described herein relate to aluminum alloys, fabricated by any rapid solidification process, and can be heat-treated (aged) to achieve precipitation and dispersion hardening. They have high strength and ductility, high creep resistance, excellent corrosion resistance, and weldability. In some embodiments, the alloys are heat and creep resistant at temperatures as high as 400° C. These alloys comprise 1 to 10% by weight magnesium, 0.3-3% by weight zirconium and preferably 0.45-3% by weight zirconium, optional 0.3-1.5% by weight vanadium, with aluminum as the remainder. The aluminum alloys contain a simultaneous dispersion of $Al_3Zr$ primary precipitates, having an average diameter ranging from 0.05 to 1.5 µm, and a dispersion of nano-precipitates of $Al_3Zr$ having $L1_2$ crystal structure in the aluminum matrix, having an average diameter ranging from 3 to 50 nm.

It has been found that thermally stable $Al_3Zr$ primary precipitates are formed during RSP and thermally stable $Al_3Zr$ nano-precipitates are formed during a subsequent aging process in the Al—Mg—Zr alloys. Both $Al_3Zr$ primary precipitates and nano-precipitates are stable and coarsening-resistant up to the operating temperature of 425° C., due to the low diffusivity of zirconium in aluminum. It results in an aluminum alloy with high strength at both room- and elevated-temperatures, for extended period of times. The alloys are completely free of scandium, or at least no scandium is added intentionally and any scandium present as an impurity does not exceed 0.05 wt %. This results in the low material cost. Due to the very high thermal stability, the disclosed materials can be extruded at a higher thermal working window (up to 450° C.) compared to Al—Mg—Sc alloys (only up to 350° C.). The foregoing results in lower extrusion forces, thus lowering the extrusion cost. It also results in denser (less porous) extruded materials, thus, higher quality extruded parts utilizing the disclosed alloys.

In some embodiments, the aluminum alloys comprise magnesium and at least one element selected from Group 4B elements Ti, Zr and Hf, Group 5B elements V, Nb and Ta, and Group 6B elements Cr, Mo and W. These alloys possess high strength at room and at elevated temperatures, high creep resistance, high corrosion resistance and good weldability.

A component fabricated from a rapidly solidified powder or ribbon utilizing a method such as additive manufacturing, spray deposition, or compaction, has a significant concentration of alloying elements trapped in solid-solution. When the manufactured component is subjected to a single-step heat treatment as discussed below, nano-scale aluminum-transition metal precipitates are formed. This differs from conventional alloys which often require a two-step heat treatment consisting of a "solutionizing" or "homogenizing" heat treatment at temperatures above about 450° C., followed by a precipitation heat treatment at temperatures between about 100 and 200° C.

DETAILED DESCRIPTION

The embodiments described herein relate to aluminum alloys, fabricated by a rapid solidification process, with high strength and ductility, high creep resistance, and excellent corrosion resistance and weldability. The alloys are heat- and creep-resistant at temperatures as high as 400° C.

In some embodiments, these alloys comprise 1 to 10% by weight magnesium, 0.3-3% by weight zirconium and preferably 0.45-3% by weight zirconium, optional 0.3-1.5% by weight vanadium, and aluminum as the remainder. The aluminum alloys contain a simultaneous dispersion of $Al_3Zr$ primary precipitates, having an average diameter ranging from 0.05 to 1.5 and a dispersion of nano-precipitates of $Al_3Zr$ having $L1_2$ crystal structure in the aluminum matrix, having an average diameter ranging from 3 to 50 nm. The alloys of disclosed embodiments can be produced by any rapid solidification process including gas atomization (e.g. to produce aluminum powders), spray deposition, melt spinning (e.g. to produce aluminum ribbons), melt extraction, beam glazing. Additionally, these alloys can be fabricated by other non-equilibrium processes such as mechanical alloying. The alloys can be heat-treated (aged) to achieve precipitation hardening.

Al—Sc alloys form nanometer-scale, coherent, $L1_2$-ordered $Al_3Sc$ precipitates (structurally and chemically analogous to the $Ni_3Al$ γ'-phase in nickel-based superalloys) resulting in significant precipitation hardening (U.S. Pat. No. 5,597,529). Scandium, however, is very expensive and rare. Moreover, $Al_3Sc$ precipitates are only coarsening resistant to 325° C. because of the moderate diffusivity of Sc in aluminum matrix. Improved coarsening resistance, to ~400° C., can be achieved by alloying Al—Sc alloys with the neighboring Group $VI_A$ transition metal (Ti, Zr, Hf), which are much slower diffusers in Al than Sc. Among the three transition metals, Zr provides the best coarsening resistance characteristics, due to favorable thermodynamic and kinetic properties in the aluminum matrix. Magnesium is commonly added to Al—Sc alloys to provide solid solution strengthening. It also improves corrosion resistance for the alloys.

Figure 1:
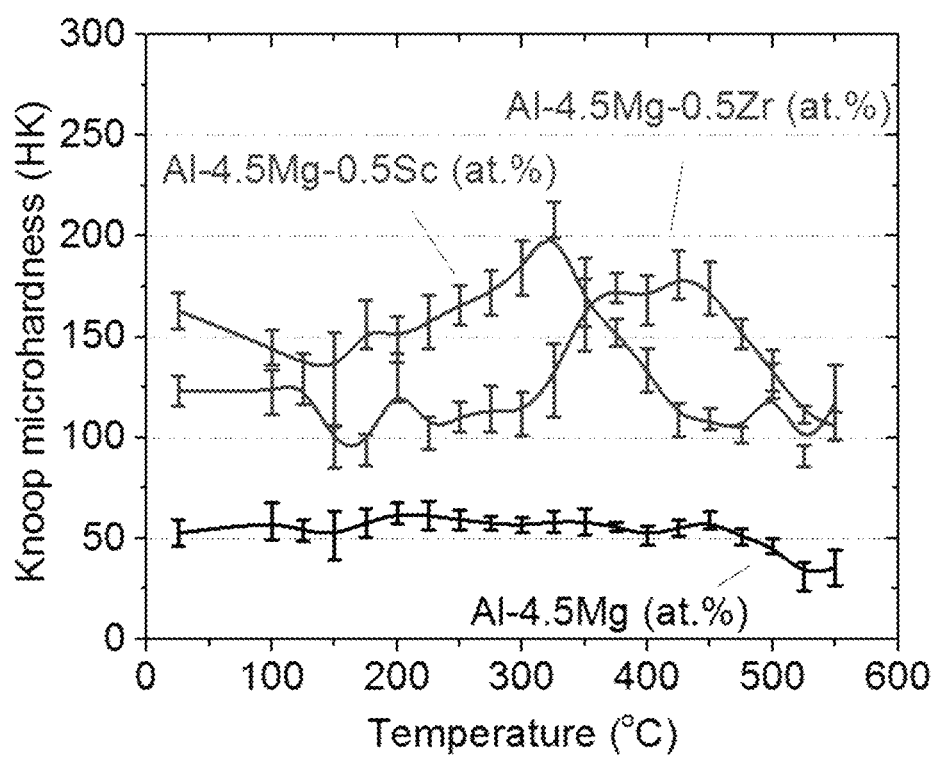
FIG. 1 is Knoop microhardness evolution, as a function of the highest aging temperature, of baseline Al-4.5Mg, Al-4.5Mg-0.5Sc and disclosed embodiment Al-4.5Mg-0.5Zr at. % alloy (Al-4Mg, Al-4Mg-0.8Sc and Al-4Mg-1.7Zr wt. %, respectively) in the form of ribbons, produced by melt spinning. Heat treatment is performed in the form of isochronal aging with 25° C./2 h increments.

In disclosed embodiments, it is shown that Zr can replace Sc completely in the Al—Mg—Sc alloys that are produced by RSP. The following alloy compositions have been produced utilizing a melt spinner, an RSP: Al-4.5Mg-0.2Zr and Al-4.5Mg-0.5Zr at. % or Al-4Mg-0.7Zr and Al-4Mg-1.7Zr wt. %. The strength of these two alloys are comparable to that of Al-4.5Mg-0.2Sc and Al-4.5Mg-0.5Sc (at. %) alloys, produced by a melt spinner. It is demonstrated in FIG. 1. Peak strength of Al-4.5Mg-0.5Zr at. %, obtained at 425° C., is comparable to that of Al-4.5Mg-0.5Sc at. %, obtained at 325° C., during isochronal aging. The discovery is important because the cost of Zr is about a thousand times lower than Sc, thus the material cost of Al—Mg—Zr alloys is low. Moreover, due to the very high thermal stability, the Al—Mg—Zr alloys can be extruded at a higher thermal working window (up to 450° C.) compared to Al—Mg—Sc alloys (only up to 350° C.). It results in lower extrusion forces, thus lowering the extrusion cost. It also results in denser material, thus, higher quality extruded parts utilizing the Al—Mg—Zr alloys.

Vanadium is known to be able to substitute Zr in the $L1_2$-structured $Al_3Zr$ phase. Thus, V co-precipitates with Zr during heat aging. Co-precipitation of V and Zr will increase the volume fraction of $Al_3(Zr,V)$ nano-precipitates, thus increasing strength of the Al—Mg—Zr—V alloys. Vanadium is also known to decrease the melting point of Al—Zr alloys, which makes the powder fabricating process easier. Moreover, elements in the Group 4B, such as Ti and Hf, and Group 5E, such as Nb and Ta, are also known to form $L1_2$-structured $Al_3(Zr,X)$ nano-precipitates, where X can be Ti, Hf, Nb, or Ta.

Zirconium has a low liquid solubility (~0.11 wt. %) at the melting temperature of aluminum (~660° C.) and a low solid solubility (<0.01 wt. %) at room temperature in aluminum. Thus, it tends to precipitate and form $Al_3Zr$ primary phase during cooling in the liquid phase and during solidification in the traditional casting process. Therefore, the maximum Zr concentration that is utilized to strengthen aluminum matrix by precipitation strengthening and/or to act as a grain refiner is limited to about 0.3 wt. % for conventional methods. Beyond this concentration, the cast material contains large $Al_3Zr$ primary phases, which do not contribute to the strengthening. However, during RSP, the solidification rate can be higher than 1,000° C./s. It takes much less than a second to solidify the molten aluminum from the casting to room temperature. Thus Zr solute atoms in the Al matrix do not have enough time to precipitate and form large primary precipitates. It was found that during a melt spinning process with the casting temperature above 1,100° C., Zr forms a dispersion of fine $Al_3Zr$ primary precipitates, having an average diameter ranging from 0.05 to 1.5 μcm, along with a high concentration of Zr solute atoms in the aluminum matrix. The fine $Al_3Zr$ primary precipitates act as reinforcement strengthener, whereas Zr solute atoms form $Al_3Zr$ nano-precipitate during subsequent heat treatment, acting as a precipitation strengthener. Both strengthening mechanisms are responsible for the observed high strength in Al-4Mg-1.7Zr wt. % alloy. Dispersion of fine primary precipitates during RSP is also anticipated in aluminum alloys containing Group 4B elements (Ti or Hf) besides Zr, Group 5B elements (V, Nb or Ta), and Group 6B elements (Cr, Mo or W). Additionally, the fine $Al_3Zr$ primary precipitates also act as grain refiner, producing small grain size in the Al matrix, which also contributes to the strengthening.

Figure 2:
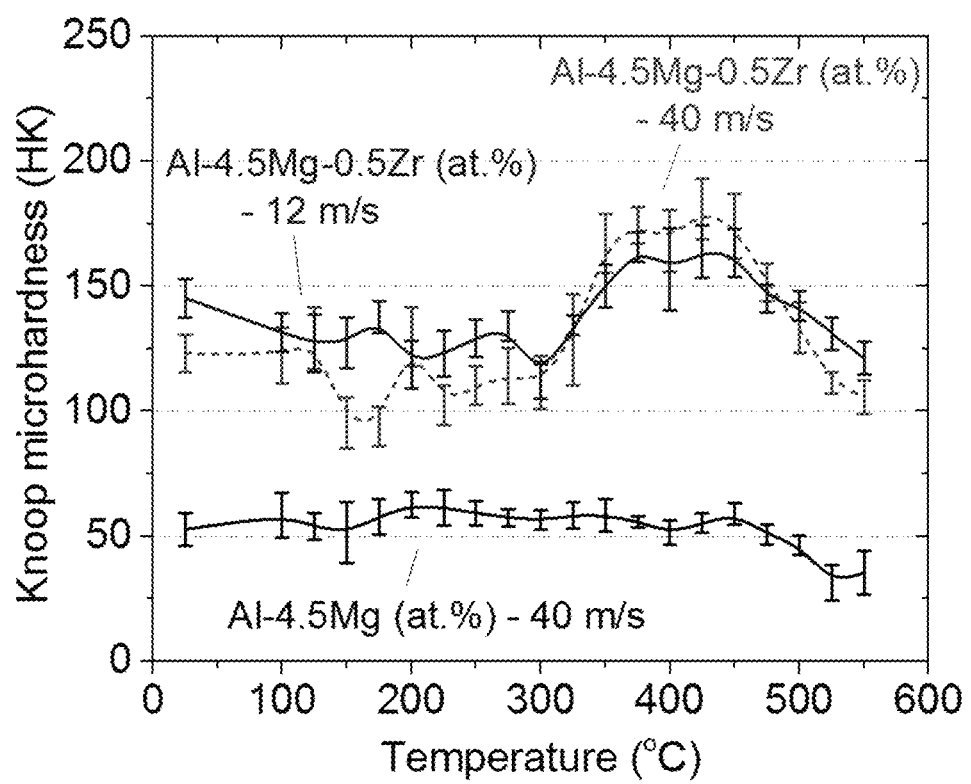
FIG. 2 is Knoop microhardness evolution, as a function of the highest aging temperature, of baseline Al-4.5Mg and disclosed embodiment Al-4.5Mg-0.5Zr at. % alloy (Al-4Mg and Al-4Mg-1.7Zr wt. %, respectively), produced by melt spinning at different wheel speeds 12 m/s and 40 m/s. Heat treatment is performed in the form of isochronal aging with 25° C./2 h increments.

In disclosed embodiments, it is shown that reducing the casting wheel speed from 40 to 12 m/s during melt spinning only slightly reduces the maximum strength of Al-4Mg-1.7Zr wt. % alloy. Reducing the casting wheel speed is equivalent to reducing the solidification rate. However, the solidification rate is anticipated to still be higher than 1,000° C./s for the lower casting wheel speed of 12 m/s. It is shown that in this high solidification rate regime, the maximum strength of Al-4Mg-1.7Zr wt. % alloy is insensitive to the actual cooling rate. This is demonstrated in FIG. 2.

Magnesium in the disclosed alloys acts as a solid solution strengthener. Magnesium has high solid solubility in aluminum at all temperatures. Thus 4 wt. % Mg remains in solid solution during RSP and subsequent heat treatments. It is also the case during arc welding, where the aluminum alloys are melted and re-solidified, or during friction-stir welding, where the aluminum alloys are heated and cooled down to room temperature. Thus, Al—Mg-based alloys are typically considered to have good weldability. Magnesium is also known for improving corrosion resistance of aluminum alloys. Therefore, Al—Mg-based alloys are commonly utilized in marine applications.

Comparing to the Al-4.5Mg-0.5Sc alloy, the Al-4.5Mg-0.5Zr at. % alloy also has a higher operating temperature range. During subsequent heat treatment, precipitation of $L1_2$-structured $Al_3Sc$ nano-precipitates occurs at the temperature range of 250-350° C., whereas precipitation of $L1_2$-structured $Al_3Zr$ nano-precipitates occurs at the temperature range of 350-450° C. This is demonstrated in FIG. 1. It means that after aging, the operating temperature of Al-4.5Mg-0.5Sc and Al-4.5Mg-0.5Zr at. % alloys need to be less than 350 and 450° C., respectively, as exceeding these temperatures would lead to rapid coarsening and loss of strength. This is important for a hot extrusion process, in which the higher thermal working window results in denser and higher quality extruded parts. It also results in lower extrusion forces, thus low-capacity extruders can be utilized. Currently the extrusion temperature for the Al-4.5Mg-0.5Sc alloy is limited to about 350° C. For the disclosed Al—Mg—Zr alloys, the compacted powders or ribbons can be extruded at temperatures up to 450° C., a large improvement in terms of thermal working window.

Figure 3:
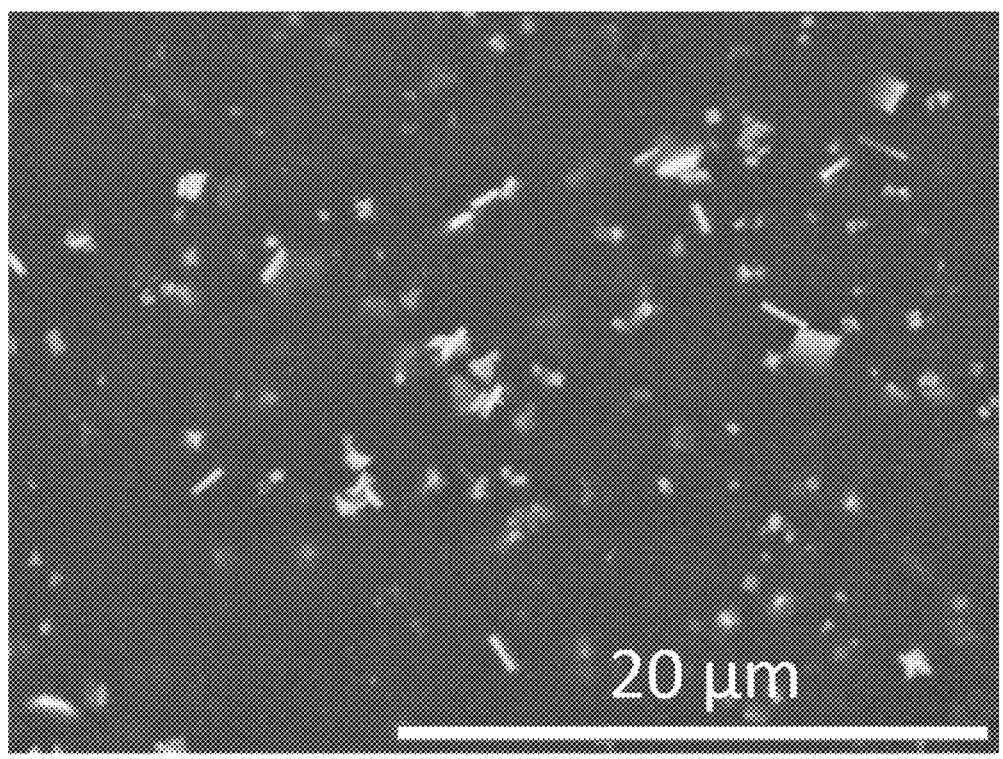
FIG. 3 shows a scanning electron microscope images of the microstructure of an example alloy Al-4Mg-1.7Zr wt. % alloy, fabricated by a melt spinning process.

FIG. 3 shows scanning electron microscope images of the microstructure of an example alloy Al-4Mg-1.7Zr wt. % alloy, fabricated by a melt spinning process. The microstructure is homogenous with a fine uniform distribution of primary $Al_3Zr$ precipitates.

Figure 4:
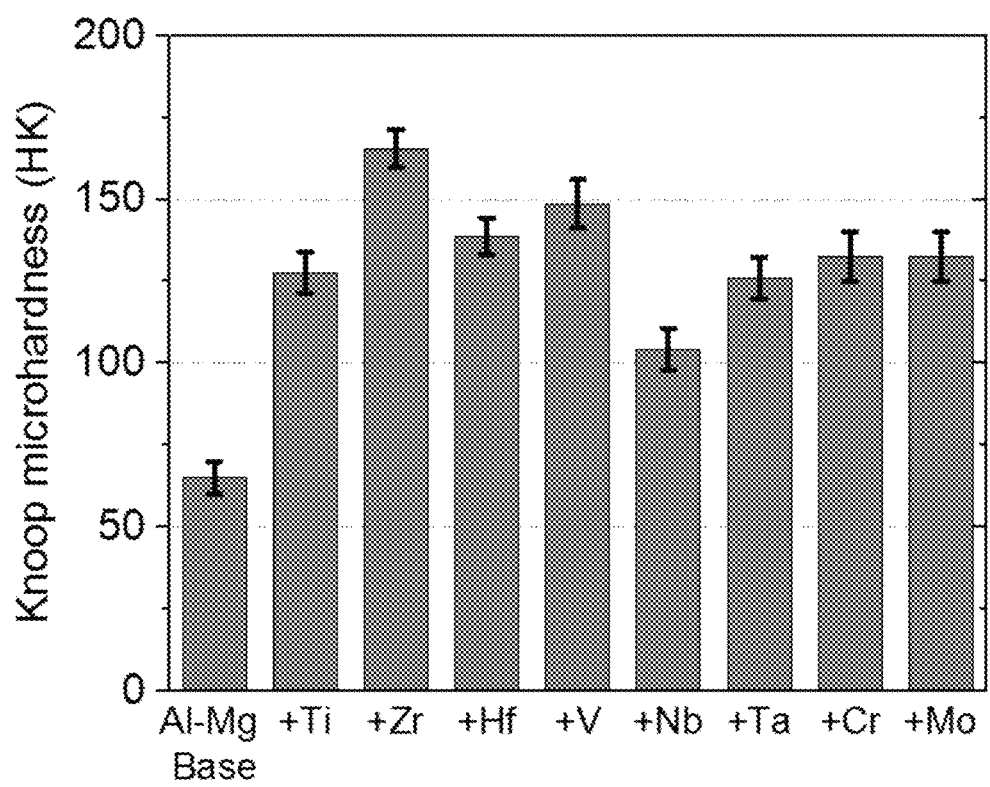
FIG. 4 shows peak microhardness of disclosed embodiments Al-4.5Mg-0.5TM at. % alloys, where TM is the indicated transition metal (Group 4B elements Ti, Zr and Hf, Group 5B elements V, Nb and Ta, and Group 6B elements Cr and Mo), produced by melt spinning at 12 m/s, during isochronal aging with 25° C./2 hr increments.

FIG. 4 shows peak microhardness of disclosed embodiments Al-4.5Mg-0.5TM at. % alloys, where TM is the indicated transition metal (Group 4B elements Ti, Zr and Hf, Group 5B elements V, Nb and Ta, and Group 6B elements Cr and Mo), produced by melt spinning at 12 m/s, during isochronal aging with 25° C./2 hr increments. It shows that additions of transition elements in the base Al-4.5Mg at. % alloy drastically increase the alloy's strength. Zirconium appears to be to the most effective, compared to other investigated transition elements.

Figure 5:
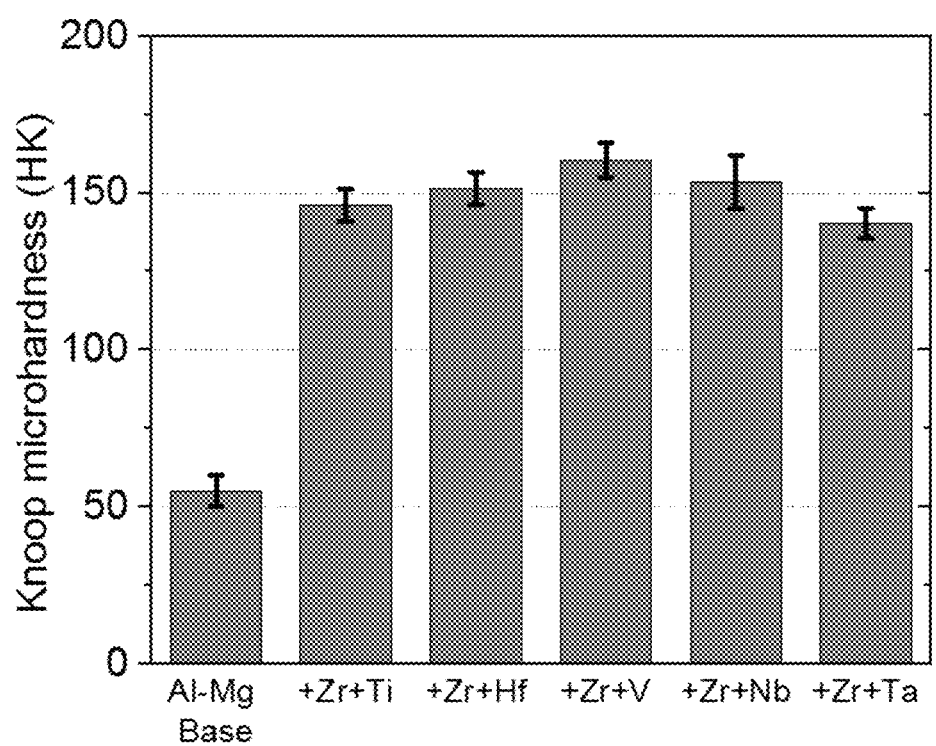
FIG. 5 shows peak microhardness of disclosed embodiments Al-4Mg-0.5Zr-0.1TM at. % alloys, where TM is the indicated transition metal (Group 4B elements Ti and Hf, and Group 5B elements V, Nb and Ta), produced by melt spinning at 12 m/s, during isochronal aging with 25° C./1 hr increments.

FIG. 5 shows peak microhardness of disclosed embodiments Al-4Mg-0.5Zr-0.1TM at. % alloys, where TM is the indicated transition metal (Group 4B elements Ti and Hf, and Group 5B elements V, Nb and Ta), produced by melt spinning at 12 m/s, during isochronal aging with 25° C./1 hr increments. It shows that additions of Zirconium, combined with other transition metals, in the base Al-4Mg at. % alloy drastically increase the alloy's strength.

Figure 6:
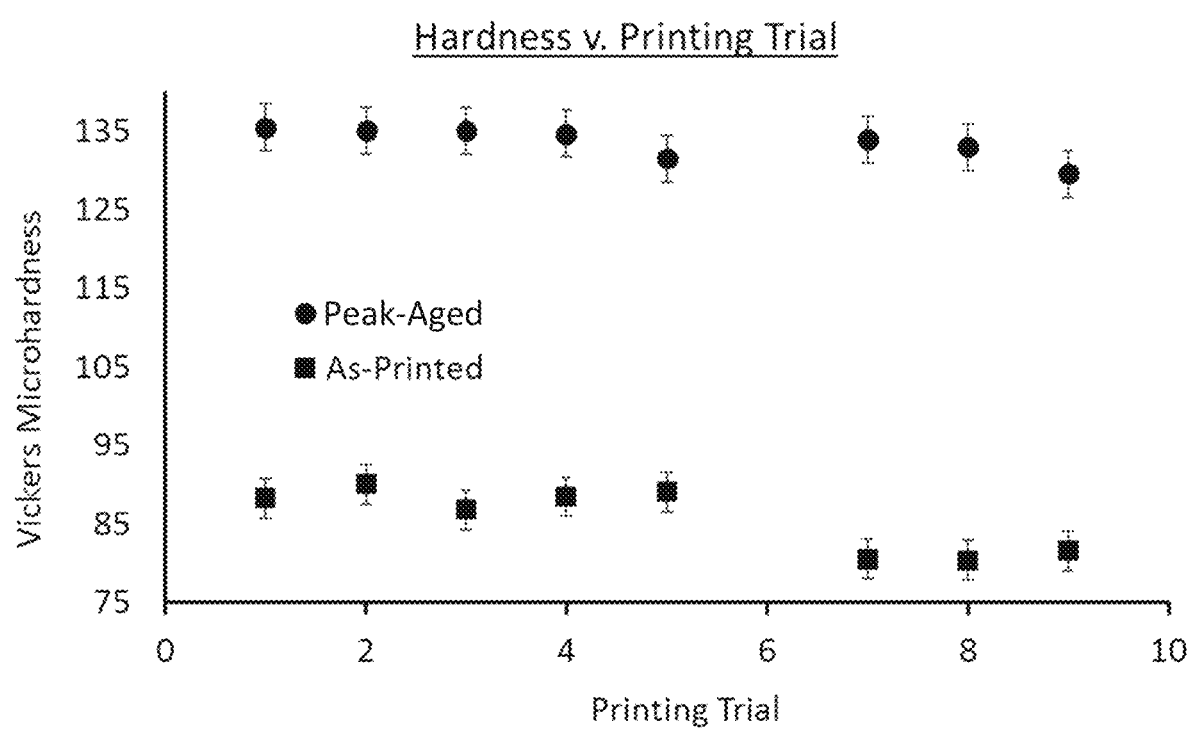
FIG. 6 shows a plot of Vickers Microhardness for several 3D-printed components, in both as-printed and peak-aged condition, from Al-3.6Mg-1.2Zr wt. % powder having the same alloy composition but being 3D-printed using different parameters.

FIG. 6 shows a plot of Vickers microhardness for several 3D-printed components from Al-3.6Mg-1.2Zr wt. % powder having the same alloy composition but being 3D-printed using different parameters. Trials 1-5 used powder with an average size of 37 μm, and trials 7-9 used powder with an average size of 13 μm. Both the as-printed hardness and the maximum achievable hardness after heat treating are statistically equivalent per a sample t-test, showing that the alloy chemistry and age-hardening potential are unaffected by the printing parameter. Error bars represent one standard deviation of 10 measurements taken on the same sample.

Figure 7:
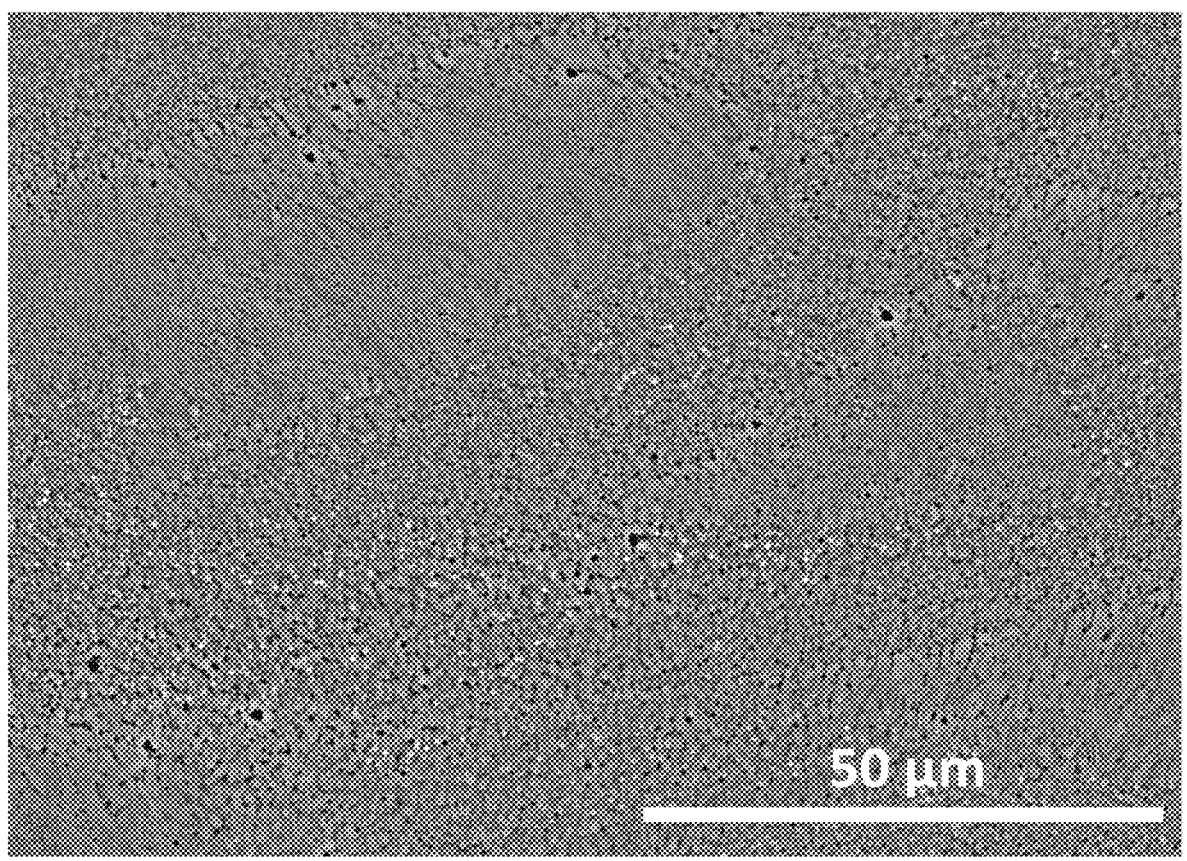
FIG. 7 shows a scanning electron micrograph of the microstructure of a 3D-printed component in the as-printed condition from Al-3.6Mg-1.2Zr wt. % powder.

FIG. 7 shows a scanning electron micrograph of the microstructure of a 3D-printed component in the as-printed condition from Al-3.6Mg-1.2Zr wt. % powder. A mixture of coarse, columnar and fine grains is evident, and primary precipitates are evident in the fine grain regions.

Figure 8:
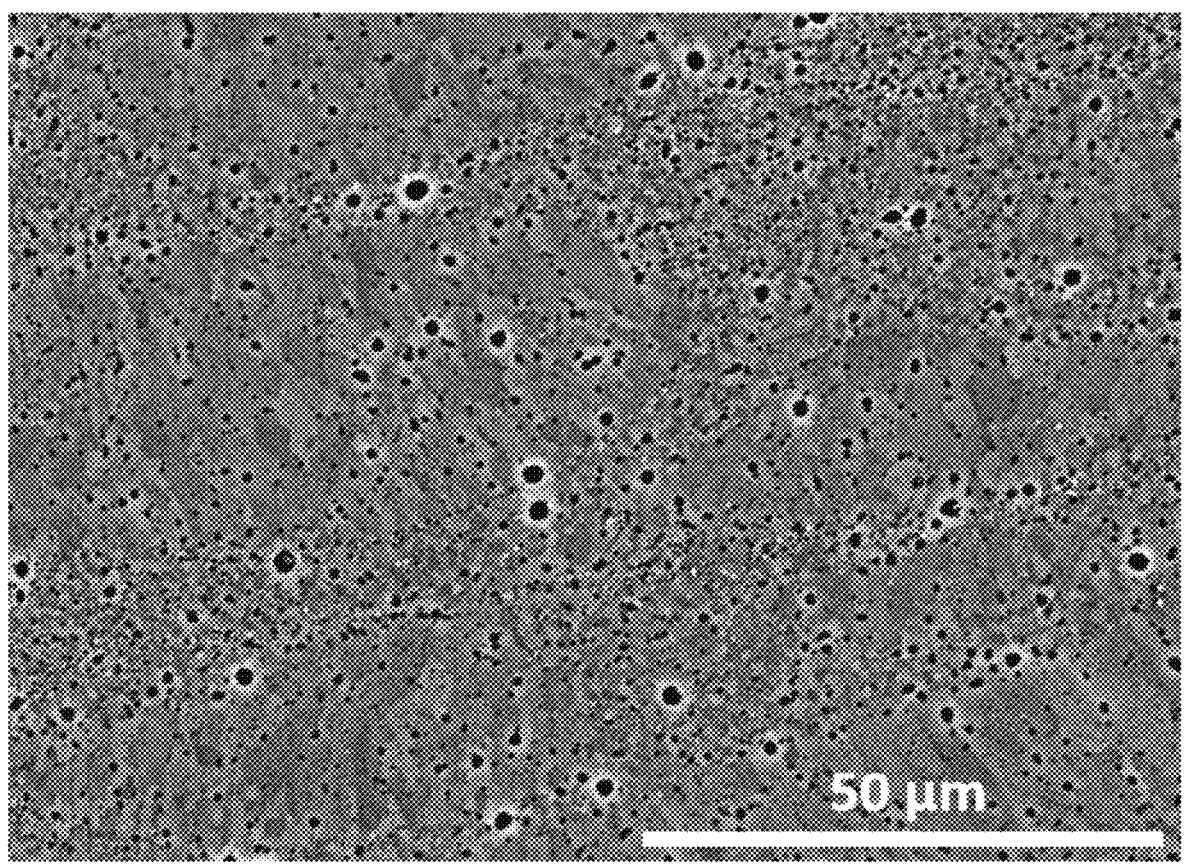
FIG. 8 shows a scanning electron micrograph of the microstructure of a 3D-printed component in the as-printed condition from Al-3.6Mg-1.2Zr wt. % powder after it has been aged at 400° C. for 8 hours.

FIG. 8 shows a scanning electron micrograph of the microstructure of a 3D-printed component in the as-printed condition from Al-3.6Mg-1.2Zr wt. % powder after it has been aged at 400° C. for 8 hours. It is evident that the coarse, columnar grains have recrystallized so that they are now equiaxed. Precipitates are evident in the fine grain regions and prohibit grain growth during aging.

Figure 9:
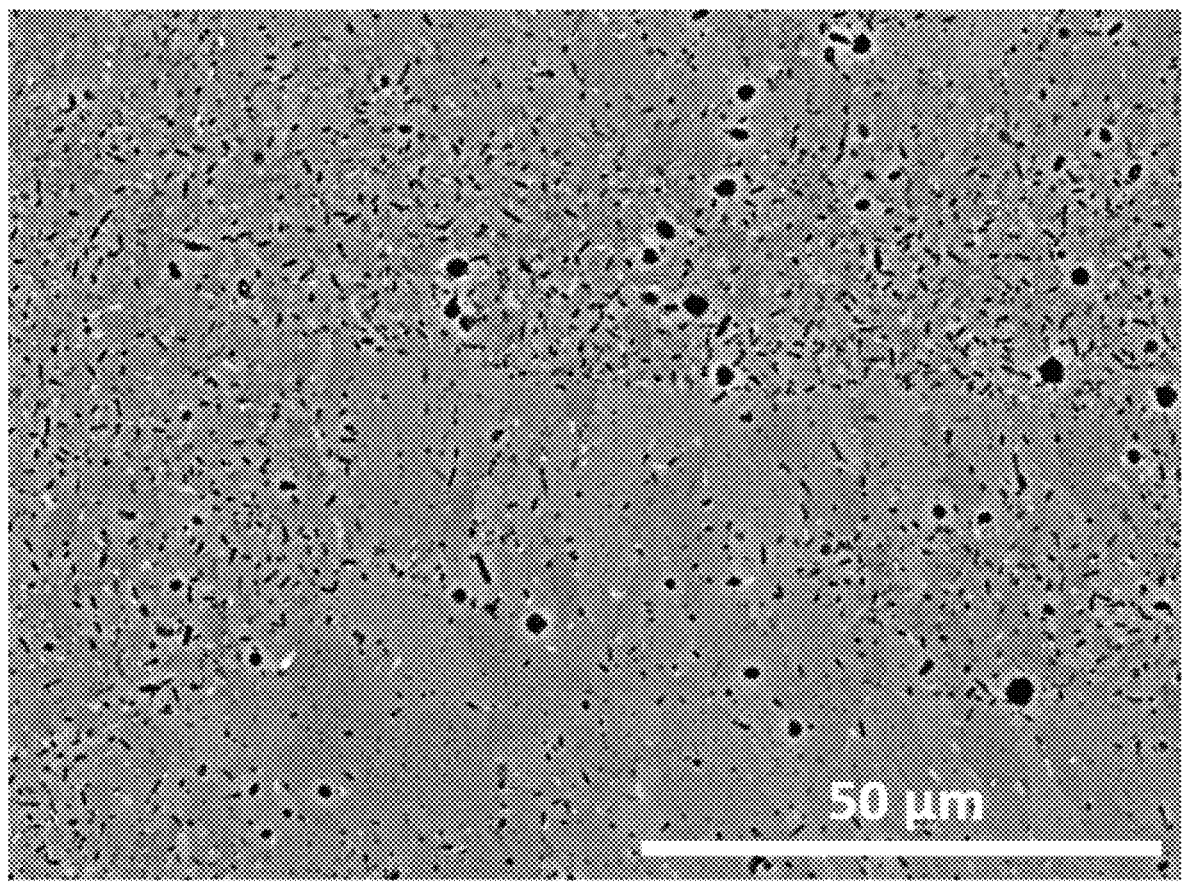
FIG. 9 shows a scanning electron micrograph of the microstructure of a 3D-printed component in the as-printed condition from Al-3.6Mg-1.2Zr wt. % powder after it has been aged at 400° C. for 144 hours.

FIG. 9 shows a scanning electron micrograph of the microstructure of a 3D-printed component in the as-printed condition from Al-3.6Mg-1.2Zr wt. % powder after it has been aged at 400° C. for 144 hours. It is evident that precipitates have coarsened, which is followed by grain growth in the fine grain region.

Figure 10:
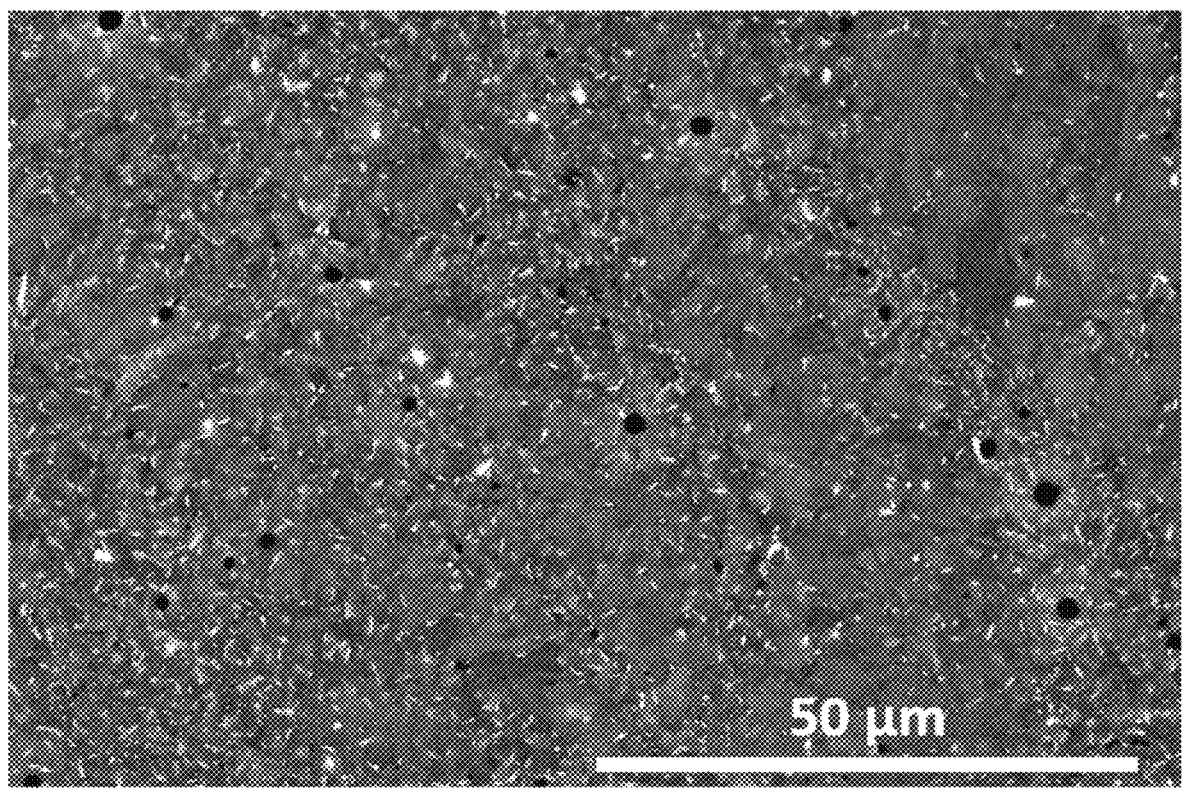
FIG. 10 shows a large-view scanning electron micrograph of the microstructure of a 3D-printed component in the as-printed condition from Al-3.6Mg-1.2Zr wt. % powder after it has been aged at 400° C. for 144 hours.

FIG. 10 shows a large-view scanning electron micrograph of the microstructure of a 3D-printed component in the as-printed condition from Al-3.6Mg-1.2Zr wt. % powder after it has been aged at 400° C. for 144 hours. It is evident that both precipitate and grain coarsening have resulted in an essentially homogenous microstructure, which promotes isotropic mechanical properties.

Figure 11:
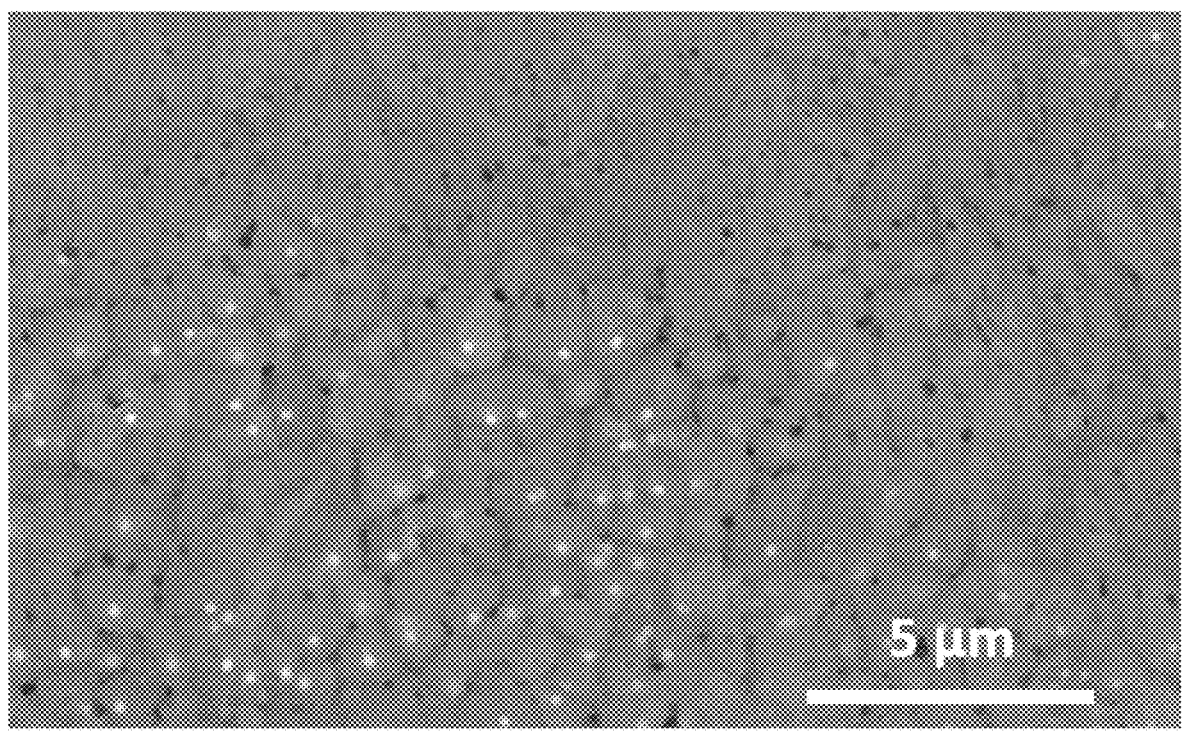
FIG. 11 shows a scanning electron micrograph of the boundary between the coarse and fine grain region of a 3D-printed component in the as-printed condition from Al-3.6Mg-1.2Zr wt. % powder.

FIG. 11 shows a scanning electron micrograph of the boundary between the coarse and fine grain regions. Cubic $L1_2$ precipitates act as seed crystals to promote formation of nano-grains in the 3D-printed component from Al-3.6Mg-1.2Zr wt. % powder.

Figure 12:
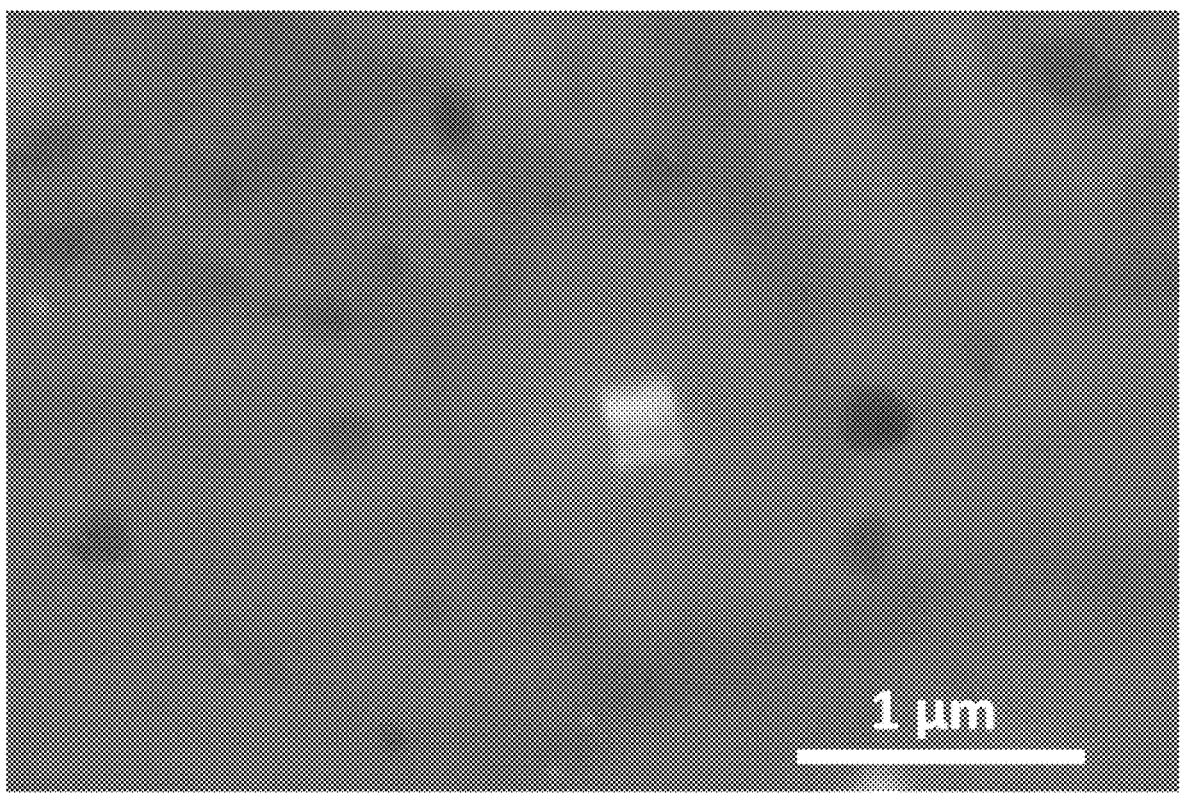
FIG. 12 shows a high-magnification scanning electron micrograph of the fine-grain region of a 3D-printed component in the as-printed condition of a 3D-printed component from Al-3.6Mg-1.2Zr wt. % powder.

FIG. 12 shows a high-magnification scanning electron micrograph of the fine-grain region of a 3D-printed component in the as-printed condition. A cubic $L1_2$ precipitate is centered in a grain, acting as a seed crystal to promote nano-grains in the 3D-printed component from Al-3.6Mg-1.2Zr wt. % powder.

Figure 13:
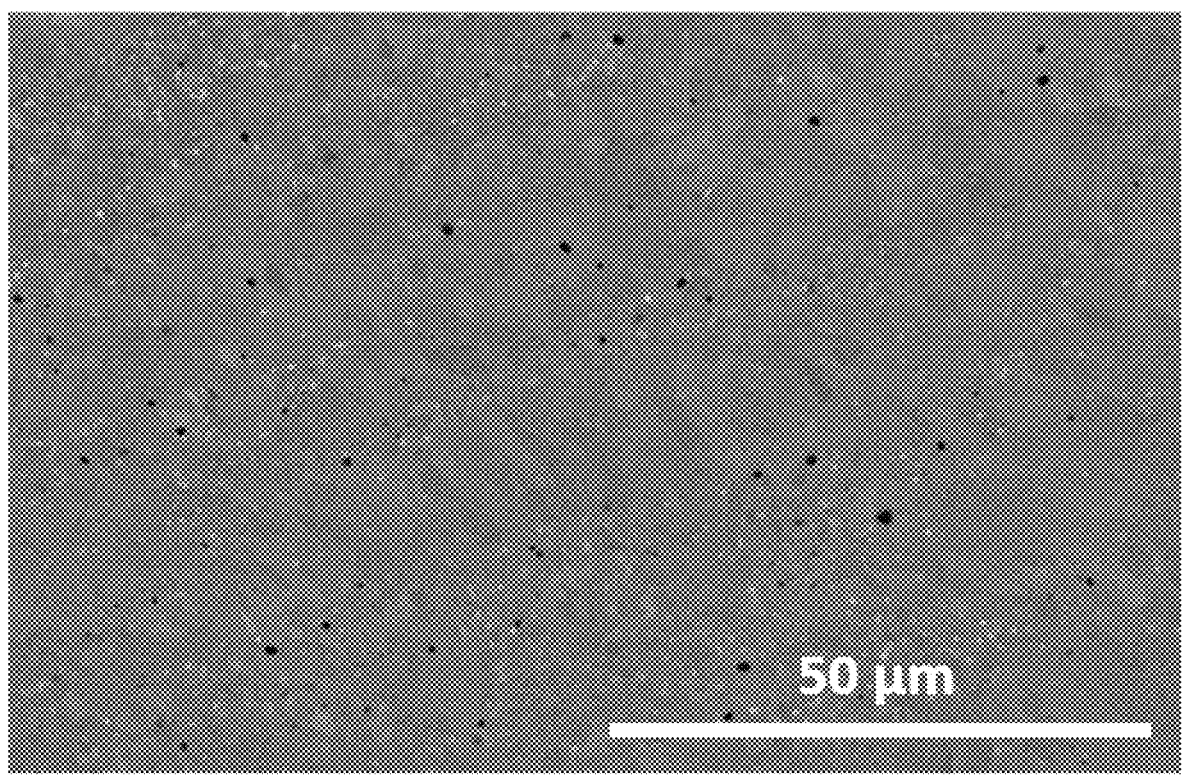
FIG. 13 shows a scanning electron micrograph of the microstructure of a 3D-printed component in the as-printed condition from Al-3.6Mg-1.2Zr wt. % powder after it has been aged at 400° C. for 8 hours followed by an extended exposure at 300° C. for 144 hours.

FIG. 13 shows a scanning electron micrograph of the microstructure of a 3D-printed component in the as-printed condition from Al-3.6Mg-1.2Zr wt. % powder after it has been aged at 400° C. for 8 hours followed by an extended exposure at 300° C. for 144 hours. Thermally stable microstructure consisting of a mixture of coarse grains and fine, equiaxed grains about 1 micrometer, is pinned by cubic $L1_2$ $Al_3Zr$ precipitates.

Figure 14:
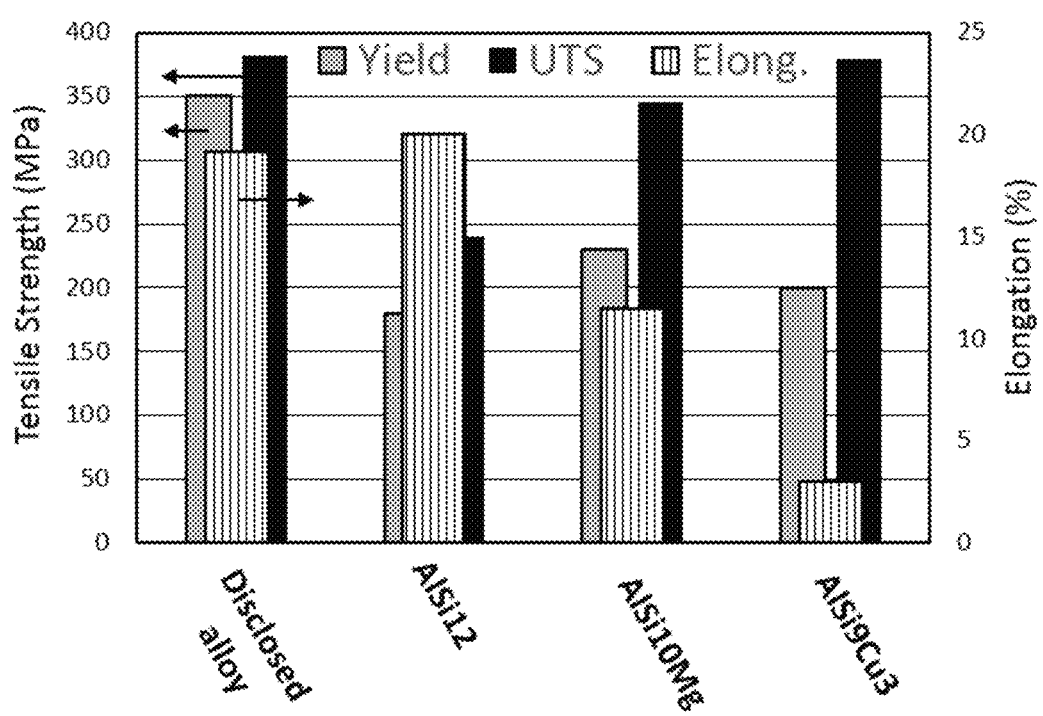
FIG. 14 compares the tensile yield strength, ultimate tensile strength (UTS), and elongation of a disclosed alloy (3D-printed component in the peak-aged condition from Al-3.6Mg-1.2Zr wt. % powder) compared to that of commercially 3D-printed aluminum alloys.

FIG. 14 compares the tensile yield strength, ultimate tensile strength (UTS), and elongation of a disclosed alloy (3D-printed component in the peak-aged condition from Al-3.6Mg-1.2Zr wt. % powder) compared to that of commercial 3D-printed aluminum alloys. Disclosed alloys achieve the highest yield strength and the best combination of yield strength and ductility, compared to that of commercial 3D-printed aluminum alloys.

Some embodiments of the disclosed aluminum alloys comprise about 1 to 10% by weight magnesium, and about 0.3 to about 3% by weight zirconium and preferably about 0.45 to about 3% by weight zirconium, with aluminum as the remainder, wherein the alloy possesses high strength and ductility at room and at elevated temperatures, high creep resistance, high corrosion resistance, and good weldability. Some embodiments further comprise about 0.3 to about 1.5% by weight of at least one of titanium, hafnium, vanadium, niobium and tantalum. In some embodiments, the alloy comprises a dispersion of $Al_3Zr$ primary precipitates, having an average diameter ranging from about 0.05 to about 1.5 µm. In some embodiments, the alloy comprises a dispersion of nano-precipitates of $Al_3Zr$ with $L1_2$ crystal structure in the aluminum matrix, having an average diameter ranging from about 3 to about 50 nm. In some of the embodiments, the alloy comprises an aluminum solid solution matrix and a simultaneous dispersion of $Al_3Zr$ primary precipitates, having an average diameter ranging from about 0.05 to about 1.5 µm, and a dispersion of nano-precipitates of $Al_3Zr$ with $L1_2$ crystal structure in the aluminum matrix, having an average diameter ranging from about 3 to about 50 nm. Some embodiments further comprise unavoidable impurities including at least one of zinc, copper, manganese, chromium, silicon and iron. Some embodiments are completely free of scandium. At least no scandium is added intentionally, though some embodiments further comprise scandium as an impurity not exceeding about 0.05 wt. %. Some embodiments are completely free of erbium, thulium, ytterbium, and lutetium. At least none of those elements is added intentionally, though some embodiments further comprise any one of erbium, thulium, ytterbium, or lutetium as an impurity not exceeding about 0.05 wt. %.

Some embodiments of the disclosed aluminum alloys comprise magnesium; and at least one element selected from Group 4B elements Ti, Zr, and Hf, Group 5B elements V, Nb and Ta, and Group 6B elements Cr, Mo and W; with aluminum as the remainder, wherein the alloy possesses high strength and ductility at room and at elevated temperatures, high creep resistance, high corrosion resistance and good weldability. In some embodiments, the alloy is completely free of an intentionally added scandium, erbium, thulium, ytterbium, or lutetium. In some embodiments, the alloy comprises a dispersion of nano-scale aluminum-transition metal precipitates in the aluminum matrix, having an average diameter ranging from about 3 nm to about 50 nm, and where the transition metals are selected from the group consisting of Ti, Zr, Hf, V, Nb, Ta, Cr, Mo, and W.

Some embodiments of the disclosed aluminum alloys are thermally stable up to an operating temperature of about 425° C. For some embodiments, the alloy can be extruded at a thermal working window up to about 450° C.

Some embodiments of the disclosed aluminum alloys are produced by a rapid solidification process. In some embodiments, the rapidly solidified alloy has a fine grain structure with average grain diameters between about 200 nm and about 2 µm. The average grain diameter is influenced by the alloy chemistry and can be controlled by the concentration of alloying components.

The disclosed aluminum alloys may be fabricated in various forms, such as powder, chips, ribbons, wires, sheets, plates, or foils. Powder fabricated from the disclosed alloys can, for example, be compacted by hot isostatic pressing, uniaxial hot pressing or any other pressure-assisted methods, and finally, optionally, extruded to a component. Ribbons fabricated from the disclosed alloys can, for example, be cut into chips, then compacted by hot isostatic pressing, uniaxial hot pressing or any other pressure-assisted methods, and finally, optionally, extruded to a component.

There are many applications for extruded components formed of the disclosed aluminum alloys, such as aerospace, automotive, and marine applications, for example.

The disclosed alloys can, for example, be fabricated as a powder and used by a cold spray process to form a protective coating for magnesium or aluminum components. The cold spray process can also be used to restore the worn surface of a component by depositing a new layer of material.

Powder fabricated from the disclosed alloys can, for example, can be utilized in an additive manufacturing method. Characteristics of the disclosed aluminum alloys, including high strength and weldability, are specifically important for additive manufacturing processes, or so-called 3D-printing, such as powder bed methods, selective laser melting, direct metal laser sintering, laser engineering net shaping, and especially powder-fed directed energy deposition. During the powder-fed directed energy deposition process, aluminum powders are fully or partially melted by laser energy and welded together to form bigger parts. Upon re-solidification, the solidification rate is very fast due to surrounding cold powders and underlying solid material acting as quenching medium. Thus, the additive manufacturing process is generally considered an RSP. Good weldability of the powders is important to create porosity-free welded or 3D-printed parts.

The additively manufactured component made of gas-atomized powders of the disclosed alloys can be heat-treated after production at temperatures between about 350 to about 450° C. for times between about 0.5 to about 24 hours to achieve precipitation and dispersion strengthening. The microstructure of such peak-aged, additively manufactured components is thermally stable and is unchanged by exposure to elevated temperatures for extended times. Such a peak-aged, additively manufactured component is strengthened by the following mechanisms: solid solution strengthening, $Al_3Zr$ primary precipitates, having an average diameter ranging from about 0.05 to about 1.5 µm, a dispersion of nano-precipitates of $Al_3Zr$ having $L1_2$ crystal structure in the aluminum matrix, having an average diameter ranging from about 3 to about 50 nm, and grain boundary strengthening resulting from fine grains.

The properties of the additively manufactured component, including high-strength and low-density (i.e., high specific strength) make it suitable for applications which require high-strength at or below room temperature. Such applications include, but are not limited to, structural components of vehicle chasses and suspensions for land-, air- and sea-craft, structural components of satellites and spacecraft, weaponry and defense systems, prosthetics, recreational and leisure equipment, artistic and novelty items.

The properties of the additively manufactured component, including high-strength and low-density (i.e., high specific strength) combined with good corrosion resistance, make it suitable for applications which require high-strength at or below room temperature in harsh environments. Such applications include, but are not limited to, structural components of sea-craft, recreational and leisure equipment, artistic and novelty items.

The properties of the additively manufactured component, including high-strength, thermal stability, and creep resistance, make it suitable for applications which require high-strength at elevated temperatures. Such applications include, but are not limited to, structural components in or near combustion-, jet-, and rocket-engines or electric motors, structural components near rotating parts which generate heat such as wheels and brake rotors, air-to-air heat exchangers and thermal management components in transportation and electronics applications.

The properties of the additively manufactured component, including high-strength, thermal stability, creep resistance, and corrosion resistance, make it suitable for applications which require high-strength at elevated temperatures in harsh environments. Such applications include, but are not limited to, liquid-to-air heat exchangers in automotive, aerospace, and marine applications, and heat exchangers in electronic components.

The additively manufactured component made of gas-atomized disclosed powders also has a fine grain structure with average grain diameters between about 200 nm and about 2 µm. Additionally, the microstructure of the additively manufactured component has a bimodal distribution of grain sizes, with a continuous network of sub-micrometer grains, and regions of elongated grains about 1 µm in width and about 2 µm to about 10 µm in length. The average grain diameter is influenced by the alloy chemistry and can be controlled by the concentration of alloying components.

In its peak-aged condition, the additively manufactured component made of gas-atomized powders of the disclosed alloys has retained its microstructure so that the component has a continuous network of fine grains ranging from about 0.5 to about 1.5 µm and regions of coarser grains ranging from about 2 µm to about 10 µm. The average grain diameter in the peak-aged, additively manufactured component is influenced by the alloy chemistry and can be controlled by adjusting the concentration of alloying components.

In its over-aged condition, the additively manufactured component made of gas-atomized powders of the disclosed alloys has undergone precipitate and grain coarsening so that the microstructure is characterized by an essentially homogenous microstructure. The average grain diameter in the over-aged, additively manufactured component is influenced by the alloy chemistry and can be controlled by the adjusting the concentration of alloying components. Additionally, some of the cubic $L1_2$ structured precipitates have transformed to platelet $D0_{23}$ structured precipitates and are located at grain boundaries in the over-aged material.

A method of producing a disclosed aluminum alloy can, for example, comprise producing the aluminum alloy by a rapid solidification process. The rapid solidification process can, for example, be selected from a group such as gas atomization, spray deposition, melt spinning, melt extraction, or beam glazing.

A method of producing a disclosed aluminum alloy can, for example, comprise producing the aluminum alloy by any non-equilibrium process. The non-equilibrium process can, for example, be mechanical alloying.

A method of performing additive manufacturing can, for example, comprise fabricating a powder form of a disclosed aluminum alloy, and utilizing the powder form in executing an additive manufacturing process. The additive manufacturing process can, for example, be selected from a group such as powder bed methods, powder fed directed energy deposition, selective laser melting, selective laser sintering, direct metal laser sintering, or laser engineering net shaping.

A method for manufacturing a component can, for example, comprise fabricating a ribbon from a disclosed aluminum alloy, cutting the ribbon into chips, compacting the chips by hot isostatic pressing, uniaxial hot pressing or any other pressure-assisted methods, and extruding the compacted chips to manufacture the component.

A method of manufacturing a component can, for example, comprise fabricating a powder from a disclosed aluminum alloy, compacting the powder by hot isostatic pressing, uniaxial hot pressing or any other pressure-assisted methods, and extruding the compacted powder to manufacture the component.

A method of manufacturing a component can, for example, comprise fabricating a powder from a disclosed aluminum alloy, compacting the powder to near-net-shape by hot isostatic pressing, uniaxial hot pressing or any other pressure-assisted methods, and machining the compact to its final shape.

A method of forming a protective coating for magnesium or aluminum components can, for example, comprise fabricating a powder from a disclosed aluminum alloy, and coating the magnesium or aluminum components by a cold spray process using the powder.

From the foregoing, it will be understood that numerous modifications and variations can be effectuated without departing from the true spirit and scope of the novel concepts of the present invention. It is to be understood that no limitation with respect to the specific embodiments illustrated and described is intended or should be inferred.

The invention claimed is:

1. A method for manufacturing an additively manufactured component, the method comprising:
    fabricating a powder form of an aluminum alloy, the alloy comprising:
        about 1 to about 10% by weight magnesium;
        about 0.30 to about 3% by weight zirconium; and
        aluminum as the remainder;
        wherein the alloy is completely free of scandium or scandium is present as an impurity not exceeding 0.05% by weight;
        wherein the alloy only includes unavoidable impurities of zinc, copper, and silicon; and
    utilizing the powder form in executing an additive manufacturing process to manufacture the additively manufactured component.

2. The method of claim 1, wherein the alloy comprises a dispersion of nano-precipitates of $Al_3Zr$ with $L1_2$ crystal structure in the aluminum matrix, having an average diameter ranging from about 3 nm to about 50 nm.

3. The method of claim 1, the alloy further comprising about 0.3 to about 1.5% by weight of at least one of titanium, hafnium, vanadium, niobium and tantalum.

4. The method of claim 1, wherein the alloy comprises a dispersion of $Al_3Zr$ primary precipitates, having an average diameter ranging from about 0.05 μm to about 1.5 μm.

5. The method of claim 1, wherein the alloy is thermally stable up to an operating temperature of about 425° C.

6. The method of claim 1, wherein the alloy has a fine grain structure with average grain diameters between about 200 nm and about 2 μm.

7. The method of claim 1, wherein the fabricating step comprises a gas-atomization process.

8. The method of claim 1, wherein the aluminum alloy is fabricated by a rapid solidification process selected from a group consisting of gas atomization, spray deposition, melt spinning, melt extraction and beam glazing.

9. The method of claim 1, the method further comprising: producing the aluminum alloy by any non-equilibrium process.

10. The method of claim 9, wherein the non-equilibrium process is mechanical alloying.

11. The method of claim 1, wherein the utilizing step comprises a process selected from a group consisting of powder bed methods, powder fed directed energy deposition, selective laser melting, selective laser sintering, direct metal laser sintering and laser engineering net shaping.

12. The method of claim 1, further comprising:
    heat-treating the component at temperatures of about 350° C. to about 450° C. for a duration of about 0.5 hours to about 24 hours.

13. The method of claim 1, wherein the alloy comprises about 3.6% by weight Mg and 1.2% by weight Zr or about 4% by weight Mg and 1.7% by weight Zr.

14. A method for manufacturing an additively manufactured component, the method comprising:
    producing a powder form of an aluminum alloy by a rapid solidification process, the alloy comprising:
        about 1 to about 10% by weight magnesium;
        about 0.3 to about 3% by weight zirconium; and
        aluminum as the remainder;
        wherein the alloy is completely free of scandium or scandium is present as an impurity not exceeding 0.05% by weight;
        wherein the alloy only includes unavoidable impurities of zinc, copper, silicon and manganese;
    utilizing the powder form of the aluminum alloy to produce a manufactured component by additive manufacturing; and
    heat-treating the manufactured component in a single step at temperatures of about 350° C. to about 450° C. for a duration of about 0.5 hours to about 24 hours.

15. The method of claim 14, wherein the rapid solidification process includes a gas-atomization process.

16. The method of claim 14, wherein the heat-treated manufactured component has a substantially homogenous microstructure.

17. The method of claim 14, wherein the heat-treated manufactured component is thermally stable up to an operating temperature of about 425° C.

18. The method of claim 14, wherein the heat-treated manufactured component includes a dispersion of primary precipitates of $Al_3Zr$ having an average diameter ranging from about 0.05 μm to about 1.5 μm.

19. The method of claim 14, wherein the heat-treated manufactured component includes a dispersion of nano-precipitates of $Al_3Zr$ with $L1_2$ crystal structure in the aluminum matrix having an average diameter ranging from about 3 nm to about 50 nm.

20. The method of claim 14, wherein the heat-treated manufactured component has a fine grain structure with average grain diameters between about 200 nm and about 2 μm.

* * * * *